(12) United States Patent
Hwang et al.

(10) Patent No.: US 9,800,287 B2
(45) Date of Patent: Oct. 24, 2017

(54) PILOT-BASED ANALOG ACTIVE INTERFERENCE CANCELLER

(71) Applicant: QUALCOMM Incorporated, San Diego, CA (US)

(72) Inventors: Insoo Hwang, San Diego, CA (US); Cong Nguyen, San Diego, CA (US); Bongyong Song, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/720,534

(22) Filed: May 22, 2015

(65) Prior Publication Data

US 2016/0344432 A1 Nov. 24, 2016

(51) Int. Cl.
 *H04B 1/10* (2006.01)
 *H04B 1/525* (2015.01)
(52) U.S. Cl.
 CPC .................................. *H04B 1/525* (2013.01)
(58) Field of Classification Search
 CPC ......... H04B 1/10; H04B 1/1036; H04B 1/123
 USPC .............................................. 455/78, 82, 83
 See application file for complete search history.

(56) References Cited

U.S. PATENT DOCUMENTS

| | | | | |
|---|---|---|---|---|
| 6,311,044 | B1 * | 10/2001 | Wilde | H04B 17/102 324/750.02 |
| 6,397,044 | B1 * | 5/2002 | Nash | H03C 3/0925 455/112 |
| 7,711,329 | B2 * | 5/2010 | Aparin | H04B 1/525 455/24 |
| 8,175,535 | B2 * | 5/2012 | Mu | H04B 1/123 455/283 |
| 8,737,911 | B2 | 5/2014 | Black et al. | |
| 8,755,459 | B2 | 6/2014 | Nentwig | |
| 8,837,612 | B2 | 9/2014 | Chintalapudi et al. | |
| 2004/0106381 | A1 * | 6/2004 | Tiller | H04B 17/11 455/73 |
| 2007/0093224 | A1 * | 4/2007 | Lo | H04B 1/1027 455/251.1 |
| 2008/0227409 | A1 * | 9/2008 | Chang | H04B 1/525 455/78 |
| 2009/0130981 | A1 * | 5/2009 | Nagai | H04B 1/126 455/63.1 |
| 2010/0112962 | A1 * | 5/2010 | van Zeijl | H04B 1/0475 455/77 |

(Continued)

OTHER PUBLICATIONS

International Search Report and Written Opinion—PCT/US2016/031529—ISA/EPO—Sep. 26, 2016.

*Primary Examiner* — Wen Huang
(74) *Attorney, Agent, or Firm* — Loza & Loza, LLP/Qualcomm

(57) ABSTRACT

Aspects of the disclosure are directed to interference cancellation. A method for performing interference cancellation in a wireless communications device having a transmitter, a receiver, a coefficient controller, an analog interference cancellation (AIC) circuit and a receive local oscillator (LO) includes utilizing a receive local oscillator (LO) to generate a transmit pilot; injecting the transmit pilot into a transmit chain for transmission; utilizing a receiver to receive a signal, wherein the signal includes the transmit pilot and an interference signal; and determining a set of coefficients for the interference cancellation based on an output signal from the receiver.

23 Claims, 11 Drawing Sheets

(56) References Cited

U.S. PATENT DOCUMENTS

| | | |
|---|---|---|
| 2013/0301688 A1 | 11/2013 | Khandani |
| 2014/0206300 A1* | 7/2014 | Hahn .................... H04B 1/525 |
| | | 455/78 |
| 2014/0273906 A1 | 9/2014 | Feygin et al. |
| 2015/0139122 A1* | 5/2015 | Rimini .................. H04B 1/123 |
| | | 370/329 |

* cited by examiner

US 9,800,287 B2

PILOT-BASED ANALOG ACTIVE INTERFERENCE CANCELLER

TECHNICAL FIELD

This disclosure relates generally to the field of interference cancellation systems and methods, and, in particular, to analog interference cancellation with a transmit pilot.

BACKGROUND

Advanced wireless devices may have multiple radios that operate on the same, adjacent, or harmonic/sub-harmonic frequencies. The radios may provide access to networks such as wireless wide area network (WWAN), a wireless local area network (WLAN), a wireless personal area network (WPAN), Global Positioning System (GPS), Global Navigation Satellite System (GLONASS), etc. Some combinations of radios can cause co-existence issues due to interference between the respective frequencies. In particular, when one radio is actively transmitting at or close to the same frequency and at a same time that another radio is receiving, the transmitting radio can cause interference to (i.e., de-sense) the receiving radio. For example, same-band interference may occur between Bluetooth (WPAN) and 2.4 GHz WiFi (WLAN); adjacent band interference between WLAN and Long Term Evolution (LTE) band 7, 40, 41; harmonic/sub-harmonic interference may occur between 5.7 GHz ISM and 1.9 GHz Personal Communications Service (PCS); and an intermodulation issue may occur between 7xx MHz and a GPS receiver.

Analog interference cancellation (AIC) cancels interference between a transmitter radio and a receiver radio by matching gain and phase of a wireless coupling path signal and in a wired AIC path, as shown in FIG. 1, where $d_t$ is a transmitted signal from a transmitter (aggressor) radio 102, and $h_c$ is a coupling channel (wireless or wired coupling path signal) from the transmitter radio 102 to a receiver (victim) radio 104. AIC 106 attempts to cancel the impact of the coupling channel $h_c$ as reflected via the negative sign on the output of AIC 106.

Interference cancellation techniques are commonly used in wireless communication systems to improve performance where undesired transmit interference (i.e., local interference) couples into a co-located receiver. An analog interference cancellation (AIC) circuit in the receiver may be used to mitigate the undesired transmit interference by subtracting a filtered copy of the transmit interference (directly available from the co-located transmitter) in the receive path to cancel the undesired transmit interference. In the case when the desired receive signal is relatively high compared to the transmit interference, the determination of AIC coefficients for interference cancellation may be distorted.

SUMMARY

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

According to various aspects of the disclosure a method for interference cancellation, including utilizing a receive local oscillator (LO) to generate a transmit pilot; injecting the transmit pilot into a transmit chain for transmission; utilizing a receiver to receive a signal, wherein the signal includes the transmit pilot and an interference signal; and determining a set of coefficients for the interference cancellation based on an output signal from the receiver.

In various aspects, an apparatus for interference cancellation, including a receive local oscillator (LO) for generating a transmit pilot; a splitter coupled to the receive LO for injecting the transmit pilot into a transmit chain for transmission; a receiver for receiving a signal, wherein the signal includes the transmit pilot and an interference signal; and a first processor coupled to the receiver for determining a set of coefficients for the interference cancellation based on an output signal from the receiver.

In various aspects, an apparatus for interference cancellation, including at least one processor; a memory for storing a first set of coefficients for initialization of an adaptive filter, the memory coupled to the at least one processor; a receiver coupled to the at least one processor for receiving a signal, wherein the signal includes a transmit pilot and an interference signal; means for utilizing a receive local oscillator (LO) to generate the transmit pilot; means for injecting the transmit pilot into a transmit chain for transmission; and means for determining a second set of coefficients for the interference cancellation based on an output signal from the receiver.

In various aspects, a computer-readable storage medium storing computer executable code, operable on a device comprising at least one processor; a memory for storing a first set of coefficients for initialization of an adaptive filter, the memory coupled to the at least one processor; a receiver coupled to the at least one processor, wherein the receiver is configured to receive a signal; and the computer executable code including instructions for causing the at least one processor to utilize a receive local oscillator (LO) to generate a transmit pilot; instructions for causing the at least one processor to inject the transmit pilot into a transmit chain for transmission; and instructions for causing the at least one processor to determine a second set of coefficients for the interference cancellation based on an output signal from the receiver, wherein the signal received by the receiver includes the transmit pilot and an interference signal.

These and other aspects of the present disclosure will become more fully understood upon a review of the detailed description, which follows. Other aspects, features, and embodiments of the present disclosure will become apparent to those of ordinary skill in the art, upon reviewing the following description of specific, exemplary embodiments of the present disclosure in conjunction with the accompanying figures. While features of the present disclosure may be discussed relative to certain embodiments and figures below, all embodiments of the present disclosure can include one or more of the advantageous features discussed herein. In other words, while one or more embodiments may be discussed as having certain advantageous features, one or more of such features may also be used in accordance with the various embodiments of the present disclosure discussed herein. In similar fashion, while exemplary embodiments may be discussed below as device, system, or method embodiments it should be understood that such exemplary embodiments may be implemented in various devices, systems, and methods.

DETAILED DESCRIPTION

Figure 1:
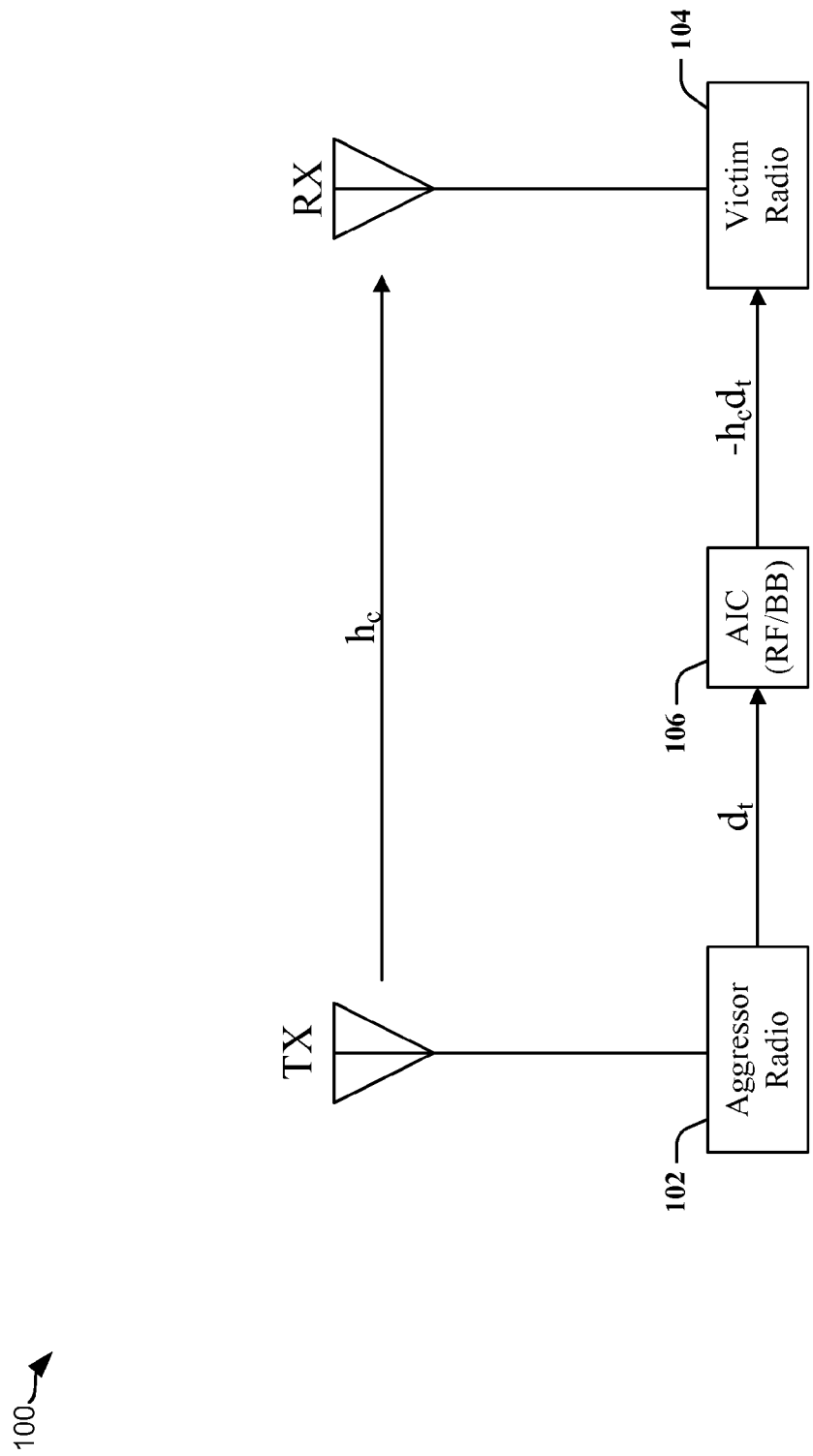
FIG. 1 is an exemplary block diagram illustrating an analog interference cancellation system.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Various aspects of the disclosure relate to systems and methods for cancelling local interference resulting from transmissions by one radio (transceiver) that affect the receiving performance of a second radio (transceiver) operating on the same or adjacent, harmonic/sub-harmonic frequencies, or intermodulation product frequencies. In particular aspects, an interference cancellation system is adaptable for different radio combinations. For instance, for a co-existence issue caused by a first combination of radios, a transmitting radio (e.g., WiFi) may be selected for an input of an interference cancellation (IC) circuit and a receiving radio (e.g., Bluetooth) may be selected for the output of the interference cancellation circuit. For a co-existence issue caused by a second (different) combination of radios, the transmitting radio (e.g., WiFi) may be selected for the input of the interference cancellation circuit and the receiving radio (e.g., LTE band 7) may be selected for the output of the interference cancellation circuit. It should be noted that the terms cancellation (as in interference cancellation) and variants thereof may be synonymous with reduction, mitigation, and/or the like in that at least some interference is reduced.

Interference cancellation circuits may use an analog one-tap least mean square (LMS) adaptive filter configured to match the signal in the interference cancellation path with the signal in the coupling path. An LMS adaptive filter may operate such that it mimics a desired filter using filter coefficients calculated to produce the least mean square of an error signal, which may represent the difference between a desired signal and an observed or receive signal. A one-tap LMS interference cancellation filter ideally focuses its peak cancellation energy at the frequency where the power of an interfering signal is at its highest and accordingly can typically address one type of interference and/or interference affecting one frequency or band of frequencies. A DC offset may be applied to the LMS filter to actively steer the cancellation center, with the value of the DC offset being automatically calculated in the digital domain in accordance with a baseband signal derived from the receiver. The DC offset may be generated using LMS filter coefficients calculated in the digital domain in accordance with the baseband signal.

In accordance with certain aspects of the present disclosure, least mean square (LMS) filter coefficients (e.g., unknown dc bias) are determined and provided to an AIC circuit for interference cancellation by minimizing the cost function, that is, minimizing the cancellation error.

Figure 2:
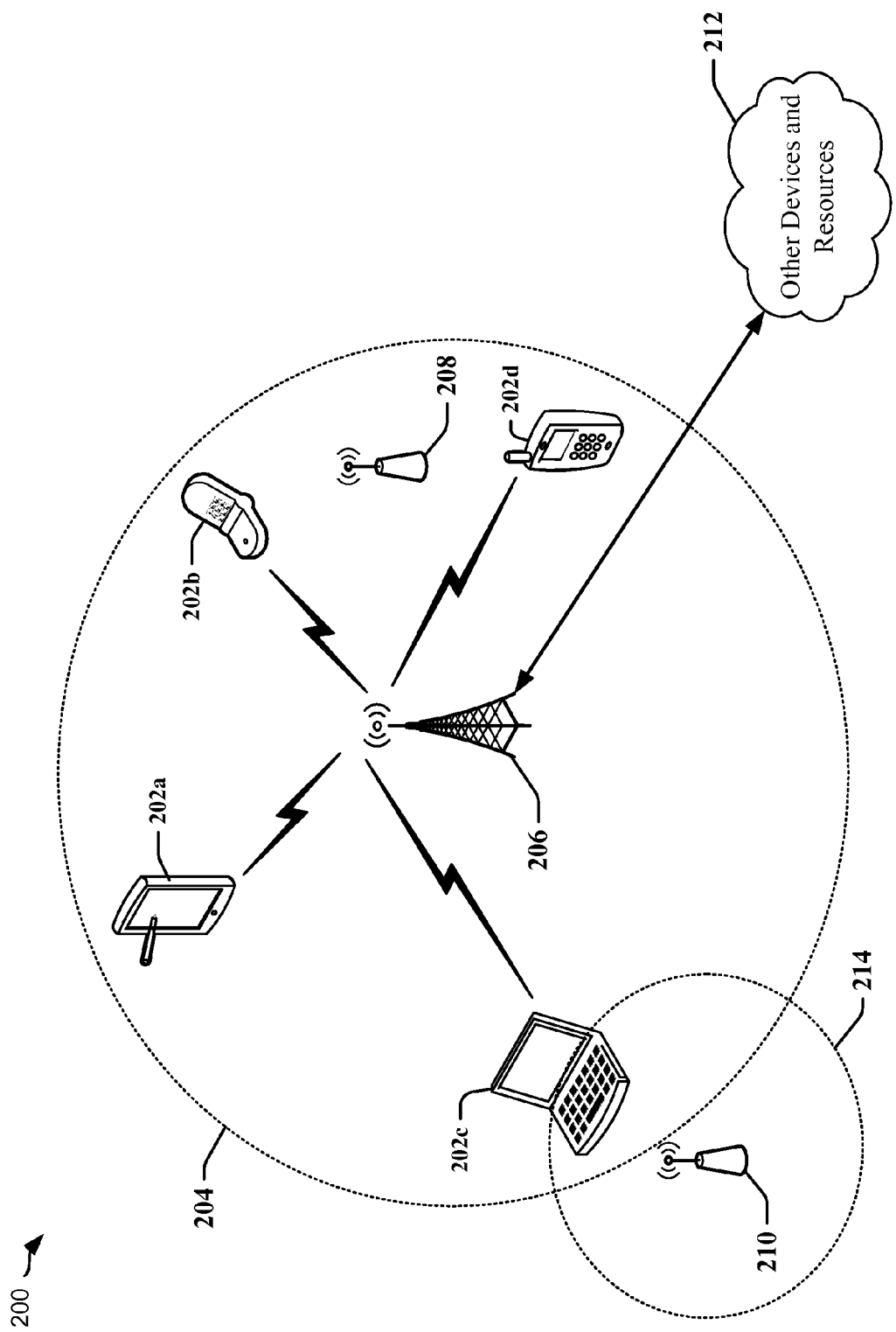
FIG. 2 is an exemplary diagram illustrating a networking environment that includes one or more wireless communication devices.

FIG. 2 is an exemplary diagram illustrating a networking environment 200 that includes one or more wireless communication devices 202a-202d. Each wireless communication device 202a-202d may be adapted or configured to transmit and/or receive wireless signals to/from at least one access point 206, 208, 210. In instances, the wireless communication device 202a-202d may be adapted or configured to transmit and/or receive wireless signals to/from at least one other wireless communication device 202a-202d. The one or more wireless communication devices 202a-202d may include a mobile device and/or a device that, while movable, is primarily intended to remain stationary. In various examples, the device may be a cellular phone, a smart phone, a personal digital assistant, a portable computing device, a wearable computing device, and appliance, a media player, a navigation device, a tablet, etc. The one or more wireless communication devices 202a-202d may also include a stationary device (e.g., a desktop computer, machine-type communication device, etc.) enabled to transmit and/or receive wireless signals. The one or more wireless communication devices 202a-202d may include an apparatus or system embodied in or constructed from one or more integrated circuits, circuit boards, and/or the like that may be operatively enabled for use in another device. Thus, as used herein, the terms "device" and "mobile device" may be used interchangeably as each term is intended to refer to any single device or any combinable group of devices that may transmit and/or receive wireless signals.

One or more of the access points 206, 208, 210 may be associated with a radio access network (RAN) 204, 214 that provides connectivity using a radio access technology (RAT). The RAN 204, 214 may connect the one or more wireless communication devices 202a-202d to a core network. In various examples, the RAN 204, 214 may include a WWAN, a WLAN, a WPAN, a wireless metropolitan area network (WMAN), a Bluetooth communication system, a WiFi communication system, a Global System for Mobile communication (GSM) system, an Evolution Data Only/Evolution Data Optimized (EVDO) communication system, an Ultra Mobile Broadband (UMB) communication system, an LTE communication system, a Mobile Satellite Service-Ancillary Terrestrial Component (MSS-ATC) communication system, and/or the like.

The RAN 204, 214 may be enabled to communicate with and/or otherwise operatively access other devices and/or resources as represented simply by cloud 212. For example, the cloud 212 may include one or more communication devices, systems, networks, or services, and/or one or more computing devices, systems, networks, or services, and/or the like or any combination thereof.

In various examples, the RAN 204, 214 may utilize any suitable multiple access and multiplexing scheme, including but not limited to Code Division Multiple Access (CDMA), Time Division Multiple Access (TDMA), Frequency Division Multiple Access (FDMA), Orthogonal Frequency Division Multiple Access (OFDMA), Single-Carrier Frequency Division Multiple Access (SC-FDMA), etc. In examples where the RAN 204, 214 is a WWAN, the network may implement one or more standardized RATs such as Digital Advanced Mobile Phone System (D-AMPS), IS-95, cdma2000, Global System for Mobile Communications (GSM), UMTS, eUTRA (LTE), or any other suitable RAT. GSM, UMTS, and eUTRA are described in documents from a consortium named "3rd Generation Partnership Project" (3GPP). IS-95 and cdma2000 are described in documents from a consortium named "3rd Generation Partnership Project 2" (3GPP2). 3GPP and 3GPP2 documents are publicly available. In examples where the RAN 204, 214 is a WLAN, the network may be an IEEE 802.11x network, or any other suitable network type. In examples where the RAN 204, 214 is a WPAN, the network may be a Bluetooth network, an IEEE 802.15x, or any other suitable network type.

A wireless communication device 202a-202d may include at least one radio (also referred to as a transceiver). The terms "radio" or "transceiver" as used herein refers to any circuitry and/or the like that may be enabled to receive wireless signals and/or transmit wireless signals. In particular aspects, two or more radios may be enabled to share a portion of circuitry and/or the like (e.g., a processing unit, memory, etc.). That is the terms "radio" or "transceiver" may be interpreted to include devices that have the capability to both transmit and receive signals, including devices having separate transmitters and receivers, devices having combined circuitry for transmitting and receiving signals, and/or the like.

In some aspects, a wireless communication device 202a-202d may include a first radio enabled to receive and/or transmit wireless signals associated with at least a first network of a RAN 204, 214 and a second radio that is enabled to receive and/or transmit wireless signals associated with an access point 206, 208, 210, a peer device or other transmitter that may geographically overlap or be collocated with the RAN 204, 214, and/or a navigation system (e.g., a satellite positioning system and/or the like).

Figure 3:
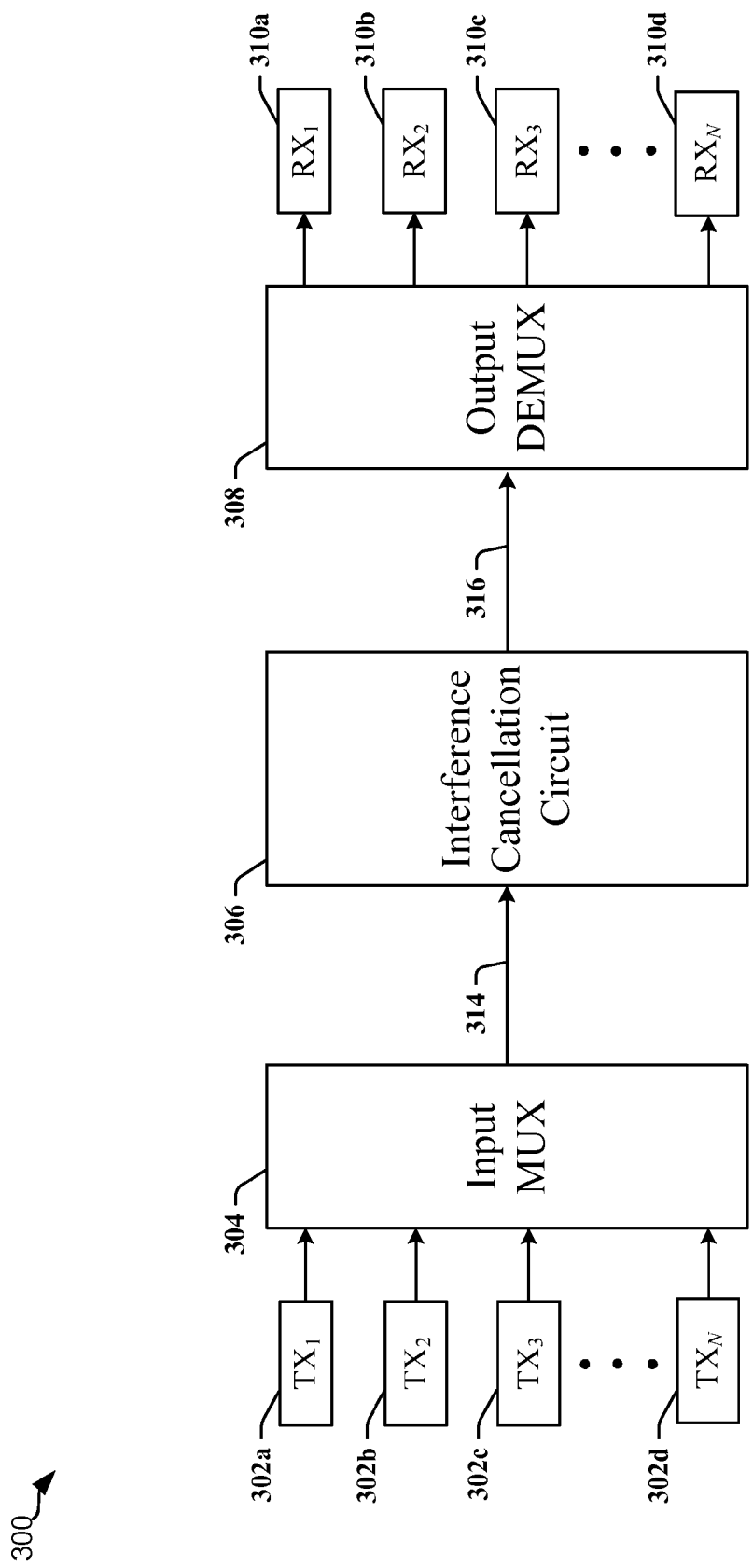
FIG. 3 is an exemplary block diagram illustrating a wireless communication device having plural transmitters and plural receivers, according to various embodiments of the disclosure.

FIG. 3 is an exemplary block diagram illustrating a wireless communication device 300 that includes a plurality of transmitters 302a-302d and a plurality of receivers 310a-310d, in accordance with certain aspects disclosed herein. The transmitters 302a-302d and receivers 310a-310d may be provided as N receiver/transmitter (Rx/Tx) circuits, including a first Rx/Tx circuit 310a/302a, a second Rx/Tx circuit 310b/302b, a third Rx/Tx circuit 310c/302c, and an Nth Rx/Tx circuit 310d/302d. Coexistence issues may occur when one or more transmitters 302a-302d are actively transmitting, and one or more receivers 310a-310d are actively receiving.

Each of the Rx/Tx circuits 310a/302a, 310b/302b, 310c/302c, and/or 310d/302d may be configured to operate according to certain parameters including, for example, a respective frequency, radio frequency circuits with group delays, coupling channel gains to other Tx/Rx circuits Rx/Tx circuits 310a/302a, 310b/302b, 310c/302c, 310d/302d, and/or the like. For instance, the first Tx/Rx circuit 310a/302a may operate at a first frequency $f_1$ with a first delay $d_1$, the second Tx/Rx circuit 310b/302b may operate at a second frequency $f_2$ with a second delay $d_2$, the third Tx/Rx circuit 310c/302c may operate at a third frequency $f_3$ with a third delay $d_3$, and the N-th Tx/Rx circuit 310d/302d may operate at an N-th frequency $f_N$ with an N-th delay $d_N$. The first Tx/Rx circuit 310a/302a may have a coupling channel gain $h_{12}$ to the second Tx/Rx circuit 310b/302b, a coupling channel gain $h_{13}$ to the third Tx/Rx circuit 310c/302c, and a coupling channel gain $h_{1N}$ to the N-th Tx/Rx circuit 310d/302d, respectively. Other Tx/Rx circuits 310a/302a, 310b/302b, 310c/302c, 310d/302d may have different coupling channel gains to various Tx/Rx circuit 310a/302a, 310b/302b, 310c/302c, 310d/302d.

In various aspects, the wireless communication device 300 is configured to reduce interference produced among Tx/Rx circuits 310a/302a, 310b/302b, 310c/302c, 310d/302d operating, for example, on the same, adjacent, harmonic, or sub-harmonic frequencies. Although the term "interference" is used in the present disclosure, in various examples, other terms, such as but not limited to, "self-interference," "internal inference," and "intra-device interference" may also be applicable. A wireless communication device 300 may be configured or adapted for different Tx/Rx circuit combinations. That is, the wireless communication device 300 may be configured to cancel interference based on a co-existence issue caused by current combination of Tx/Rx circuits 310a/302a, 310b/302b, 310c/302c, and/or 310d/302d. For example, a co-existence issue at a time $T_1$ may be caused when the first transmitter 302a is employed for WiFi and the second receiver 310b is employed for Bluetooth. In conventional systems, the apparatus may be configured to selectively provide the output of the first transmitter 302a to an interference cancelling (IC) circuit 306, which may then provide an interference cancellation signal 316 to the second receiver 310b. Accordingly, the interference cancellation circuit 306, interference caused by the aggressor Tx/Rx circuit 310a/302a upon the victim Tx/Rx circuit 310b/302b may be reduced. In various examples, the coupling channel gain from the aggressor 310a/302a to the victim Tx/Rx circuit 310b/302b may be −10 dB based on separation of two antennas, and the interference cancellation circuit 306 may be configured to match this gain for successful interference cancellation. In operation aspects, the wireless communication device 300 may include a multiplexer (MUX) circuit 304 and a demultiplexer (DEMUX) circuit 308 that may be controlled to select an interference cancellation configuration. In various examples where the wireless communication device 300 includes one transmitter and one receiver, the multiplexer and demultiplexer are not required.

In certain wireless communication systems, transmit interference may degrade the performance of a nearby (local) receiver. To mitigate this problem, interference cancellation may be used to minimize transmit interference in the receiver. Interference cancellation may in some examples be performed by adaptively estimating coefficients in an analog interference cancellation (AIC) circuit. Blind coefficient computation for AIC circuits may be preferred in some cases due to its simpler implementation. However, in some cases, when the desired receive signal energy is relatively high (comparable to the transmit interference), the determination of optimal AIC circuit coefficients may be distorted due to the presence of the strong desired receive signal. This is because there is a weak correlation between the reference signal for interference cancellation (from the AIC circuit) and the total receive signal. (Total receive signal includes the desired receive signal plus transmit interference.) That is, the receiver may receive a superposition of both interference and the desired receive signal, which may prevent a clean interference measurement if the power of the desired receive signal is high, relative to the interference. As a consequence, a cost function of the coefficients may not follow a quadratic characteristic, which is a characteristic to facilitate coefficient optimization. Thus, disclosed herein is an interference cancellation technique, which allows unperturbed determination of AIC coefficients in the presence of strong desired receive signal relative to the interference.

Figure 4:
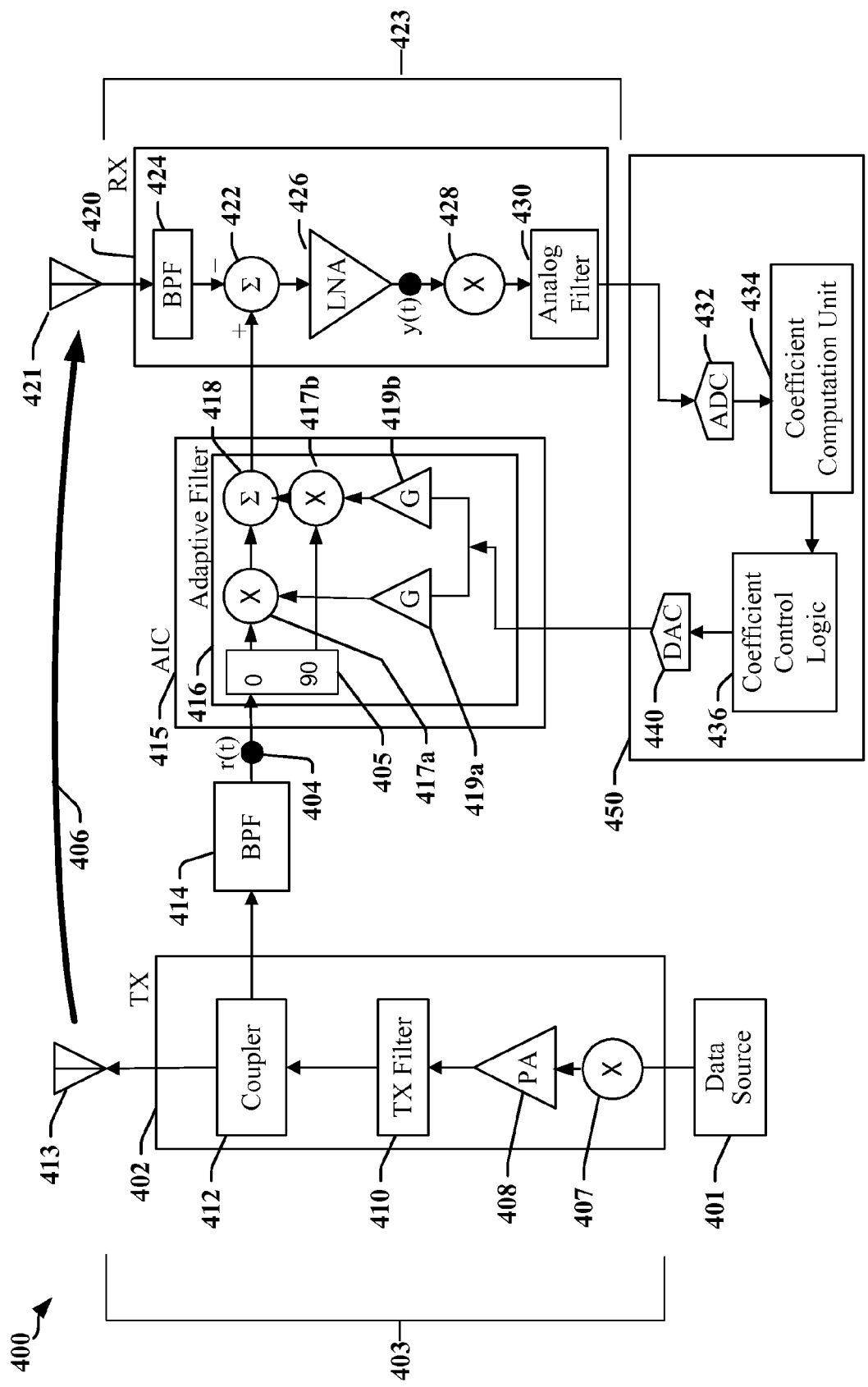
FIG. 4 is a block diagram illustrating a first exemplary system for cancelling local interference between a transmitter and a receiver in accordance with certain aspects disclosed herein.

FIG. 4 is a block diagram illustrating a first exemplary system (interference cancellation system 400) for cancelling local interference between a transmitter 402 and a receiver 420 in accordance with certain aspects disclosed herein. The interference cancellation system 400 may employ a blind coefficient control algorithm. In various aspects, the interference cancellation system 400 may reduce the number of RF components. In various examples, where the power of the desired receive signal is relatively high, compared to the interference, a correlation measurement of the total receive signal (i.e., desired receive signal and interference) with a reference signal may result in a correlation value which leads to a non-convex (i.e., non-quadratic) cost function In various examples, the desired receive signal's duty cycle pattern will affect the evaluation of the cost function.

In various examples, FIG. 4 depicts a single input single output (SISO) case. However, the interference cancellation system 400 may be associated with one or more subsystems, apparatus, devices, or components, including more than one transmitter and/or more than one receiver, for example, as illustrated in FIG. 3. The transmitter (TX) 402 may be an offending transmitter and the receiver 420 may be a victim receiver. An offending transmitter is the source of an interference signal and a victim receiver is the recipient of the interference signal. That is, the transmitter 402 (a.k.a. offending transmitter 402) may be an offender that generates or causes local interference in connection with over-the-air signals (e.g., an interference signal 406) received by the receiver 420 (a.k.a. victim receiver 420). The offending transmitter 402 and the victim receiver 420 may be part of the same device or not. In various aspects, the transmitter 402 is one of the transmitters 302 shown in FIG. 3 and the receiver 420 is one of the receivers 310 shown in FIG. 3.

In FIG. 4, a source transmit waveform enters a transmit chain 403. The transmit chain 403 is the signal path within the transmitter 402. The source transmit waveform (from a data source 401) is upconverted in frequency by an upconversion mixer 407 with a transmit local oscillator (LO), not shown. The transmitter 402 may be associated with or coupled to a power amplifier (PA) 408 and a transmit filter (TX filter) 410, which are components well-known in the art and thus a further description is omitted for the sake of brevity. The PA 408 may receive a signal or data from the data source 401 (through the upconversion mixer 407) for transmission by the transmitter 402. The upconverted transmit waveform is amplified by the power amplifier (PA) 408. The amplified transmit waveform is then filtered by the TX filter 410.

The transmitter 402 may be associated with a transmit coupler 412. The filtered transmit waveform is then sent to a transmit antenna 413 through the transmit coupler 412, to produce a transmit signal which may appear as radiative interference (i.e., an interference signal 406) into a receive chain 423 via a receive antenna 421. The receive chain 423 is a signal path within the receiver 420. The receive antenna 421 captures a receive signal, which, for example, may include a desired receive signal and the interference signal 406.

The transmit coupler 412 may also be used to provide a reference signal r(t) 404 (through a bandpass filter (BPF) 414 to an AIC circuit 415. Although a bandpass filter (BPF) is shown herein, one skilled in the art would understand that any suitable filter for the particular application (e.g., low pass filter (LPF), high pass filter (HPF), transmit-reject filter, harmonic filter, image reject filter, etc.) may be used. In this respect, the path from the transmit coupler 412, through the BPF 414, to the AIC circuit 415 may serve as a reference path in order to provide the reference signal r(t) 404.

The AIC circuit 415 may include an adaptive filter 416 (e.g., a least mean square (LMS) adaptive filter such as a one-tap LMS adaptive filter) to adaptively modify the frequency response of the reference signal r(t) 404 to match more closely the undesired transmit interference (i.e., interference signal 406). The reference signal r(t) 404 may correspond to all or some portion or function of the signal transmitted by the transmitter 402. In various examples, the AIC circuit 415 may include an adaptive filter 416, for example, to filter the reference signal r(t) 404.

Broadly, the AIC circuit 415 may be configured to generate an output signal that matches the interference signal 406 as closely as possible, such that the AIC output may be combined with the interference signal 406 in a destructive fashion to cancel the local interference to the receiver 420. The local interference may be the undesired transmit interference coming from the transmitter 402; that is, the interference signal 406. Within the AIC circuit 415, the adaptive filter 416 (e.g., a LMS adaptive filter), in various examples, may be implemented by sending the reference signal 404 to a quadrature splitter 405 to split the reference signal 404 into two paths, an in-phase reference path (0 degree output) and a quadrature reference path (90 degree output). The in-phase reference path includes an in-phase mixer 417a and the quadrature reference path includes a quadrature mixer 417b. Next, the output of the in-phase mixer 417a and the output of the quadrature mixer 417b are sent to an adder 418 to produce a controlled reference signal that may be supplied as an input to another adder 422 of receiver (RX) 420. Although components 418 and 422 are depicted as adders in FIG. 4, one skilled in the art would understand that either of the components 418 or 422 may be a combiner, a subtractor, a hybrid, an integrator or another component that combines, adds or subtracts signals.

In some instances, the interference signal 406 is part of the signal received by the adder 422 through a BPF 424. The receive chain 423 includes the BPF 424. Although a bandpass filter (BPF) is shown herein, one skilled in the art would understand that any suitable filter for the particular application (e.g., low pass filter (LPF), high pass filter (HPF), transmit-reject filter, harmonic filter, image reject filter, etc.) may be used. The output of the BPF 424 produces a filtered receive signal. The adder 422 may be configured to combine its inputs (from the AIC circuit 415 and the BPF 424) in order to generate an output that is provided to a low-noise amplifier (LNA) 426. In various examples, the output of the adder 422 is a difference between the input from the AIC circuit 415 and the input from the BPF 424. That is, the adder 422 may be configured to subtract the input provided by the AIC circuit 415 from the input received from the BPF 424. In an ideal case where selection of filter coefficients for the adaptive filter 416 is perfect, the signal provided at the input of the adder 422 is equal to the interference associated with the interference signal 406, such that the interference is removed in the signal provided to the LNA 426.

The interference cancellation system 400 may provide for the BPF 414 in the reference signal path and the BPF 424 coupled to the receiver antenna to have substantially the same filter characteristics. That is, filtering both signals in substantially the same way can help ensure that any timing mismatch between the reference signal r(t) and the interference signal 406 (i.e., a receive signal to the receiver) is reduced or eliminated.

The output y(t) from the LNA 426 may be provided to a mixer 428. The mixer 428 then converts the output y(t) from the LNA 426 from a first signal domain or frequency to a second signal domain or frequency. For example, the first signal domain may relate to a selected radio frequency and the second signal domain may relate to baseband frequencies. Here, a baseband signal may include an unmodulated signal, a lowpass signal, or a signal at relatively low frequencies, in some examples corresponding to an audible range up to 20 kHz, for example. In some instances, the mixer 428 may receive a signal from a local oscillator such as a voltage-controlled oscillator (VCO) (not shown) in order to provide the conversion to baseband. The output baseband signal from the mixer 428 may be provided to an analog filter 430 that may operate as an anti-aliasing filter.

In various examples, the interference cancellation system 400 includes a coefficient controller 450 for determining optimal coefficients for interference cancellation according to some criterion. For example the criterion may be based on minimizing a least mean square (LMS) error. As illustrated in the example in FIG. 4, the coefficient controller 450 includes an analog-to-digital converter (ADC) 432, a coefficient computation unit 434, a coefficient control logic 436 and a digital-to-analog (DAC) 440. The output of the analog filter 430 from the receiver 420 may be provided to an analog-to-digital converter (ADC) 432 shown to reside within the coefficient controller 450. The ADC output is inputted to a coefficient computation unit 434 for coefficient computation to produce coefficients for the interference cancellation which are then inputted to a coefficient control logic 436. The coefficient computation unit 434 may utilize the criterion to determine the coefficients. The coefficient control logic 436 may be configured to generate and output one or more signals representative of DC offset, and/or coefficients (e.g., LMS coefficients) to the AIC circuit 415. The coefficient control logic 436 may produce an output in a digital format, and the output may be provided to a digital-to-analog converter (DAC) 440. The coefficient control logic 436 may produce a variety of digital format including fixed point, floating point, mantissa/exponent, compressed, etc. In various examples, the coefficient controller 450 is a processing circuit with one or more processors to provide the functions of the components (e.g., coefficient computation unit 434 & coefficient control logic 436) that reside within the coefficient controller 450.

The output of the DAC 440, an analog control signal, may then be provided to the AIC circuit 415. The analog control signal may be split into two paths. A first path, designated as an in-phase control path 451a, includes an in-phase amplifier 419a with gain G and the in-phase mixer 417a. A second path, designated as a quadrature control path 451b, includes a quadrature amplifier 419b with gain G and the quadrature mixer 417b. In various examples, the gain G is real. These two control paths merge with the two reference paths described above at the two mixers; that is, the in-phase mixer 417a and the quadrature mixer 417b. In various examples, the two control paths are in-phase and quadrature components of the analog control signal.

It should also be understood that the components described herein in FIG. 4 are not exclusive and that other components may be included or some of the components described may be excluded without violating the scope and spirit of the disclosure.

In the present disclosure, the interference cancellation may be performed in the presence of a strong desired receive signal, which is uncorrelated with the interference. That is, since the desired signal is not correlated with the interference reference signal, it does not interfere with the coefficient determination. The cost function is based on a DC term and follows a quadratic characteristic.

Interference cancellation circuits (which may include all or portions of the interference cancellation system 400 of FIG. 4) provided according to certain aspects disclosed herein may be adapted to simultaneously handle multiple interference sources and/or types that may affect a receiver. In various examples, a source of interference may be a nearby and/or local transmit antenna that transmits signals (e.g., LTE signals in frequencies allocated to LTE). These signals can produce strong interference at a receive antenna (e.g., a Wi-Fi receive antenna). Different types of interference may be produced, including interference caused by out-of-band (OOB) emission, fundamental emission, and phase noise. Interference may be produced even if the frequencies used by the Wi-Fi channel are far from the frequencies used by LTE. In various examples, interference may occur between the 2.462 GHz Wi-Fi Channel 11 and LTE transmissions in LTE band 40 (B40), which is allocated frequencies between 2.3 GHz and 2.4 GHz with a bandwidth of 100 MHz. Interference may occur because the channelization filter, which may be an analog anti-aliasing filter, is placed after a mixer, and an excessive amount of energy falls into the Wi-Fi band and saturates a receiver front end. Although the examples described herein may be based on LTE signals, other wireless signal types are equally applicable to the examples herein and are intended to be covered by the present disclosure.

In various aspects, a receive local oscillator (LO) generates a receive LO signal which may be used as a transmit pilot to create a strong correlation in the receiver. After frequency downconversion, interference cancellation is manifested at DC (i.e., zero baseband frequency). The strong correlation at DC enables the receiver to cancel the interference since the downconverted desired receive signal will have little or no component at DC after frequency downconversion. For example, least mean square (LMS) coefficient algorithms that operate at baseband may be utilized for this purpose.

A transmit pilot may increase the sidelobe emission out of the transmitter. The sidelobe emission may be controlled by adjusting the receive LO power to meet the sidelobe emission requirements. In various examples, there may be a balance between meeting the sidelobe emission requirements and interference cancellation performance.

Figure 5:
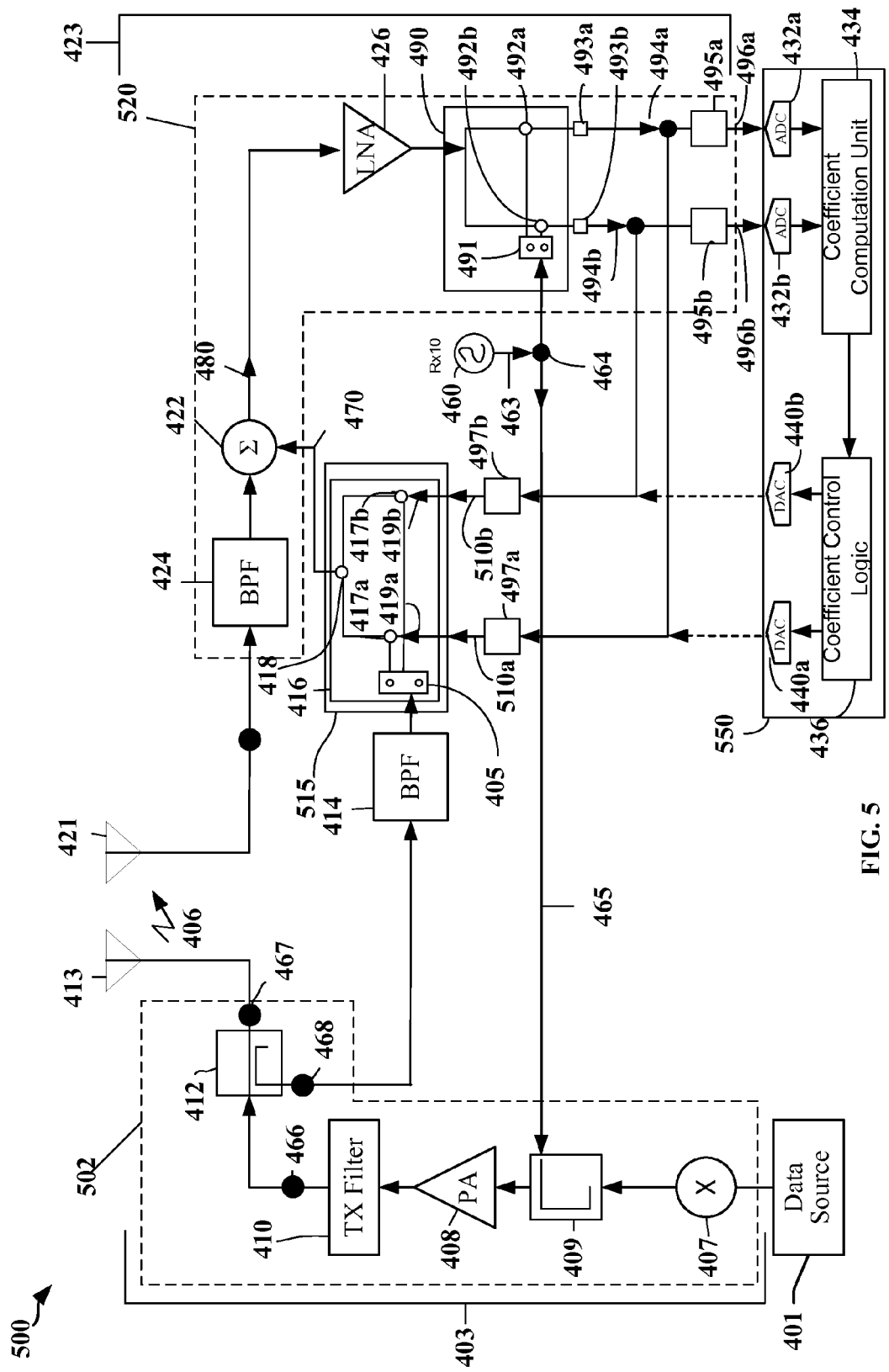
FIG. 5 is a block diagram illustrating a second exemplary system for cancelling local interference between a transmitter and a receiver in accordance with certain aspects disclosed herein.

FIG. 5 is a block diagram illustrating a second exemplary system (interference cancellation system 500) for cancelling local interference between a transmitter 502 and a receiver 520 in accordance with certain aspects disclosed herein. FIG. 5 shares many of the same components as that shown in FIG. 4. Thus, the functions and descriptions of the components shown in FIG. 5 that are the same as the components shown in FIG. 4 are not repeated herein for the sake of brevity. And, the same components in FIGS. 4 and 5 will share the same item numbers.

In FIG. 5, the transmitter 502 includes an upconversion mixer 407, a cross coupler 409, a power amplifier (PA) 408, a transmit filter (TX filter) 410, a transmit coupler 412 and a transmit antenna 413. A receive local oscillator (LO) 460 generates receive LO signal 463 which may be used as a transmit pilot in the transmit chain 403. The receive LO signal 463 is passed through a splitter 464. In a first path of the splitter 464, the receive LO signal 463 is sent to a quadrature downconverter 490 for downconversion of signal(s) in the receive chain 423. For example, the receive LO signal 463 is used for downconverting the difference signal 480 described below.

In a second path of the splitter 464, the receive LO signal 463 is sent to the transmit chain 403 via a path 465 (i.e., a transmission line) and injected into the cross coupler 409. In the transmit chain 403, the receive LO signal 463 is used as a transmit pilot. In various aspects, the receive LO signal 463 is injected into the transmit chain 403 to create a strong correlation in the interference cancellation system 500. The transmit pilot is amplified (via PA 408) and filtered (via TX filter 410). The amplified/filtered transmit pilot at point 466 is inputted into the transmit coupler 412. The transmit coupler 412 generates a through output which is sent to the transmit antenna 413 through the point 467 and a coupled output which is sent to the AIC circuit 515 through the point 468 and via the BPF 414. The output of the AIC circuit 515 is a filtered control signal 470 (which includes the transmit pilot). The filtered control signal 470 of the AIC circuit 515 (which may be outputted from the adapter filter 416) is configured as an input to the adder 422 (which may be a subtractor) that matches the interference signal 406 as closely as possible, such that the AIC output may be combined with the interference signal 406 in a destructive fashion to cancel the local interference to the receiver 520.

As the through output of the transmit coupler 412, the transmit pilot becomes part of the interference signal 406 that is radiated by the transmit antenna 413 and received (as interference) by a receive antenna 421 and then filtered by the BPF 424. Following the BPF 424, the filtered control signal 470 (which includes the transmit pilot) and the interference signal 406 (which also includes the transmit pilot) are inputted into the adder 422. With proper phasing of the adder 422 inputs (i.e., to yield a relative input phase difference of 180°), the adder 422 output may include a difference signal 480 equal to the difference between the interference signal 406 and the filtered control signal 470. The difference signal 480 may be sent to a low noise amplifier (LNA) 426 and a quadrature downconverter 490 which employs the receive LO signal 463 generated by the receive LO 460. The usage of the receive LO signal 463 as an LO reference for the quadrature downconverter 490 in the receiver 520 and as a transmit pilot in the transmitter 502, results in a strong correlation in the interference cancellation system 500.

In various examples, the quadrature downconverter 490 includes a quadrature splitter 491 and two mixers 492a, 492b to generate an in-phase analog signal and a quadrature analog signal at baseband. The in-phase analog signal is sent to a first anti-aliasing filter 493a and the quadrature analog signal is sent to a second anti-aliasing filter 493b. The anti-aliasing filters 493a, 493b attenuate any undesired image outputs of the two mixers 492a, 492b.

The outputs of the anti-aliasing filters 493a, 493b are an in-phase baseband signal 494a and a quadrature baseband signal 494b, respectively. The in-phase baseband signal 494a and the quadrature baseband signal 494b are then respectively inputted to an in-phase baseband filter 495a and a quadrature baseband filter 495b to yield an in-phase filtered baseband signal 496a and a quadrature filtered baseband signal 496b. In various examples, the in-phase filtered baseband signal 496a and the quadrature filtered baseband signal 496b are inputted into the coefficient controller 550 to generate in-phase and quadrature AIC coefficients for interference cancellation. In various examples, the in-phase baseband filter 495a and a quadrature baseband filter 495b may be eliminated such that the in-phase baseband signal 494a and the quadrature baseband signal 494b are directly inputted into the coefficient controller 550. The functionality and the components that reside within coefficient controller 550 are the same as described for coefficient controller 450 with the addition of a second ADC and a second DAC.

For example, the in-phase filtered baseband signal 496a and the quadrature filtered baseband signal 496b may be digitized by a pair of analog-to-digital converters (ADCs) 432a, 432b and inputted to a coefficient computation unit 434 for coefficient computation to produce coefficients for the interference cancellation which are then inputted to a coefficient control logic 436. The coefficient control logic 436 may be configured to generate and output one or more signals representative of DC offset, and/or LMS coefficients to the AIC circuit 515. The coefficient control logic 436 may produce an output in a digital format, and the output may be provided to digital-to-analog converters (DACs) 440a, 440b. The outputs of the DACs 440a, 440b are analog control signals which are provided to the AIC circuit 515.

In various examples, the outputs of the DACs 440a, 440b are filtered by an in-phase reference filter 497a and a quadrature reference filter 497b, respectively, to yield an in-phase reference signal 510a and a quadrature reference signal 510b and then inputted to the AIC circuit 515. The in-phase reference signal 510a and the quadrature reference signal 510b may serve as inputs to the adaptive filter 416. Within the adaptive filter 416, in-phase reference signal 510a is amplified by the in-phase amplifier 419a with gain G and then mixed by the in-phase mixer 417a with the coupled output after the coupled output is filtered by the BPF 414 and split by the quadrature splitter 405. Similarly, within the adaptive filter 416, quadrature reference signal 510b is amplified by the quadrature amplifier 419b with gain G and then mixed by the quadrature mixer 417b with the coupled output after the coupled output is filtered by the BPF 414 and split by the quadrature splitter 405. Next, the output of the in-phase mixer 417a and the output of the quadrature mixer 417b are sent to an adder 418 to produce a controlled reference signal that may be supplied as an input to another adder 422 of receiver (RX) 520.

In various examples, the in-phase baseband signal 494a and the quadrature baseband signal 494b (outputs of the two anti-aliasing filters 493a, 493b) are filtered by an in-phase reference filter 497a and a quadrature reference filter 497b, respectively, to yield an in-phase reference signal 510a and a quadrature reference signal 510b and then inputted to the AIC circuit 515. The in-phase reference signal 510a and the quadrature reference signal 510b may serve as inputs to the adaptive filter 416. Within the adaptive filter 416, in-phase reference signal 510a is amplified by the in-phase amplifier 419a with gain G and then mixed by the in-phase mixer 417a with the coupled output which is sent to the AIC circuit 515 through the point 468 and via the BPF 414. Similarly, within the adaptive filter 416, quadrature reference signal 510b is amplified by the quadrature amplifier 419b with gain G and then mixed by the quadrature mixer 417b with the coupled output which is sent to the AIC circuit 515 through the point 468 and via the BPF 414. Next, the output of the in-phase mixer 417a and the output of the quadrature mixer 417b are sent to an adder 418 to produce a controlled reference signal that may be supplied as an input to another adder 422 of receiver (RX) 520.

Figure 6:
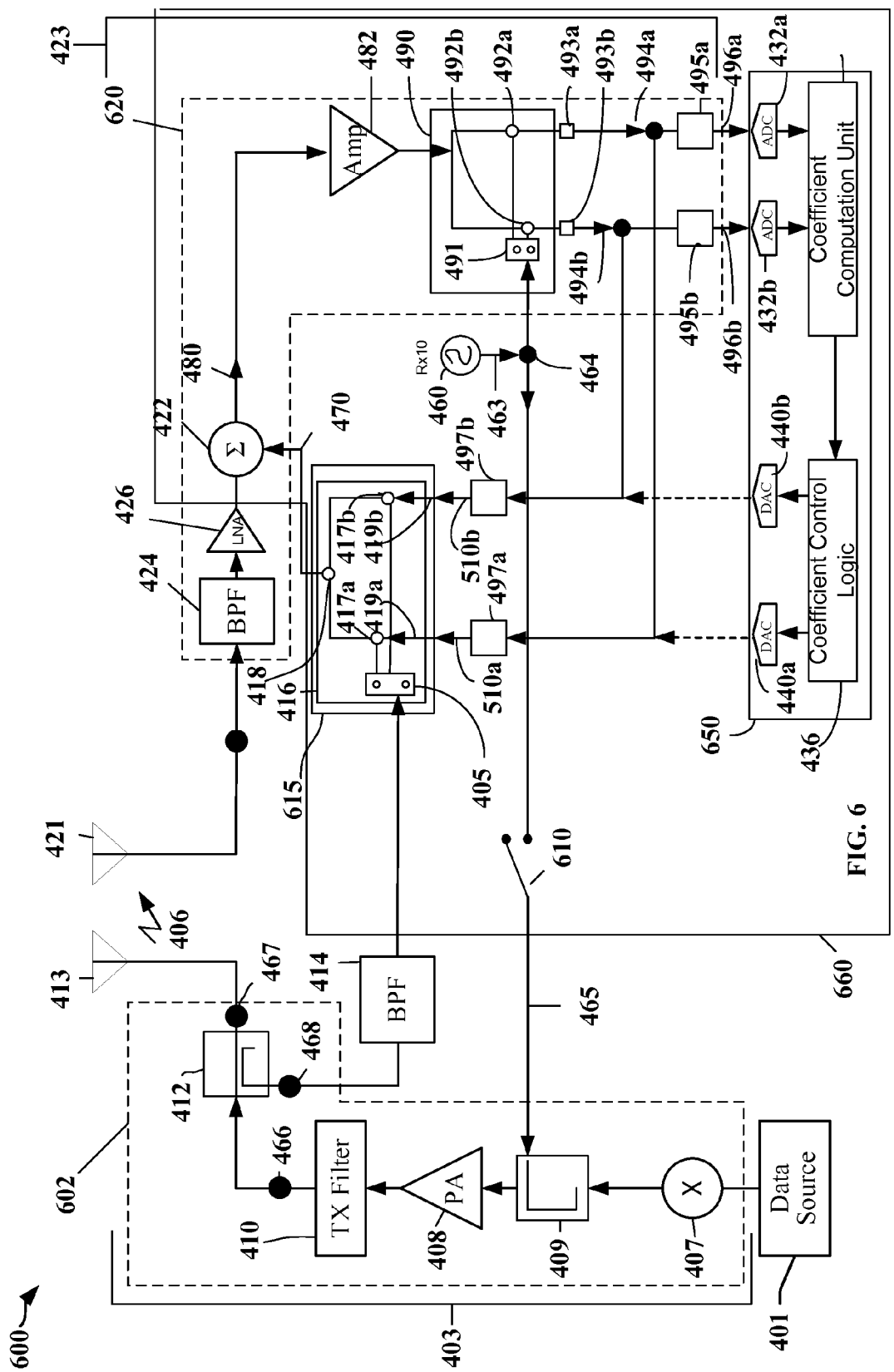
FIG. 6 is a block diagram illustrating a third exemplary system for cancelling local interference between a transmitter and a receiver in accordance with certain aspects disclosed herein.

FIG. 6 is a block diagram illustrating a third exemplary system (interference cancellation system 600) for cancelling local interference between a transmitter 602 and a receiver 620 in accordance with certain aspects disclosed herein. FIG. 6 shares many of the same components as that shown in FIG. 5. Thus, the functions and descriptions of the components shown in FIG. 6 that are the same as the components shown in FIG. 6 are not repeated herein for the sake of brevity. And, the same components in FIGS. 5 and 6 will share the same item numbers.

In the interference cancellation system 600, the LNA 426 is after the BPF 424 and before the adder 422. That is, the output of the BPF 424 is an input to the LNA 426, and the output of the LNA 426 is an input to the adder 422. Additionally, the output (the difference signal 480) of the adder 422 is inputted into an amplifier 482. The interference cancellation system 600 includes a switch 610 which allows the victim receiver 620 to utilize the transmit pilot configuration opportunistically. That is, if the desired receive signal strength is low, the switch 610 is set as open (i.e., the path 465 is disabled) and a non-pilot-based interference cancellation algorithm is used in generating the coefficients for the AIC circuit 615. And, if the desired receive signal strength is high, the switch 610 is set as closed (i.e., the path 465 is enabled) and a pilot-based interference cancellation algorithm is used in generating the coefficients for the AIC circuit 615. The functionality and the components that reside within coefficient controller 650 are the same as described for coefficient controller 550. In various examples, the components within the boundary 660 are part of an integrated circuit for implementing the interference cancellation system 600.

Figure 7:
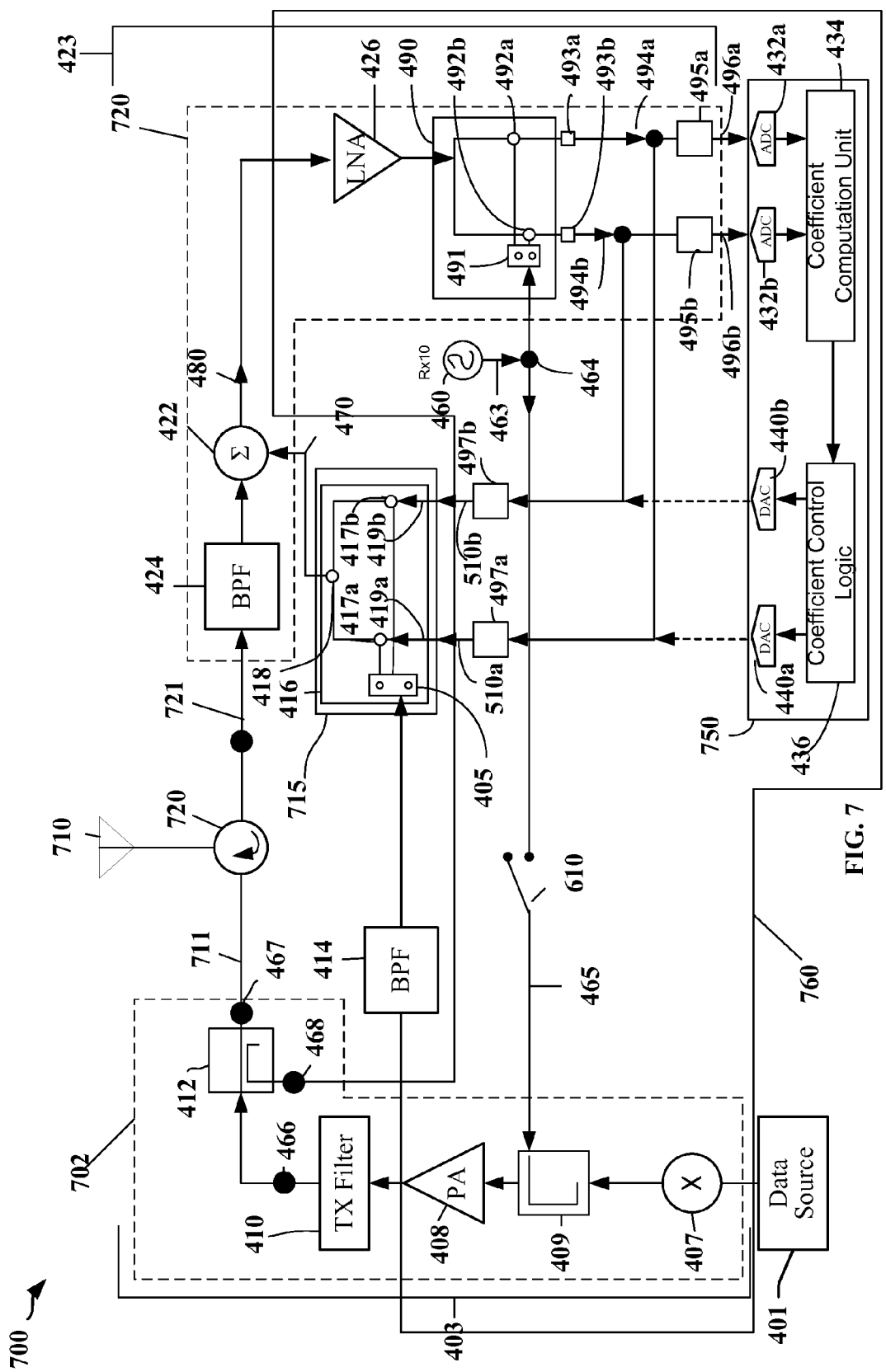
FIG. 7 is a block diagram illustrating a fourth exemplary system for cancelling local interference between a transmitter and a receiver in accordance with certain aspects disclosed herein.

FIG. 7 is a block diagram illustrating a fourth exemplary system (interference cancellation system 700) for cancelling local interference between a transmitter 702 and a receiver 720 in accordance with certain aspects disclosed herein. FIG. 7 shares many of the same components as that shown in FIGS. 5 and 6. Thus, the functions and descriptions of the components shown in FIG. 7 that are the same as the components shown in FIGS. 5 and 6 are not repeated herein for the sake of brevity. And, the same components in FIGS. 5, 6 and 7 will share the same item numbers. The functionality and the components that reside within coefficient controller 750 are the same as described for coefficient controller 550.

Similar to the interference cancellation system 600 of FIG. 6, the interference cancellation system 700 of FIG. 7 includes a switch 610 which allows the victim receiver 720 to utilize the transmit pilot configuration opportunistically. That is, if the desired receive signal strength is low, the switch 610 is set as open and a non-pilot-based interference cancellation algorithm is used in generating the coefficients for the AIC circuit 715. And, if the desired receive signal strength is high, the switch 610 is set as closed and a pilot-based interference cancellation algorithm is used in generating the coefficients for the AIC circuit 715.

In the interference cancellation system 700, one antenna 710 serves both transmit and receive functions. A circulator 720 separates the transmit path 711 from the receive path 721. Since the functions and implementations of circulators are well known, the respective descriptions are not repeated herein. In various examples, the components within the boundary 760 are part of an integrated circuit for implementing the interference cancellation system 700. In various examples, the circulator 720 may be replaced by a duplexer. Similarly, since the functions and implementations of duplexers are well known, the respective descriptions are not repeated herein.

In various examples, the receive LO 460 may be set to different frequencies. For example, when the victim receiver 720 is not in use, the receive LO 460 may be set to a transmit frequency of the offending transmitter 702, rather than the receive frequency of the victim receiver 720. The interference cancellation system 500 may include a victim receiver 720 and a victim transmitter (not shown) where the victim transmitter operates with a different radio access technology (RAT) and at a different frequency than the offending transmitter 702. In various examples, the victim transmitter may be set into a power saving mode to prevent any packet transmission while the receive LO 460 is set to a frequency. The receive LO 460 set to the transmit frequency of the offending transmitter 702 may inject a transmit pilot into the offending transmitter 702 at its transmit frequency. This configuration allows interference cancellation at a fundamental frequency (associated with the transmit frequency) which may avoid receiver front-end saturation from the fundamental frequency, rather than from out of band emission. In various examples, the offending transmitter 702 operates at an LTE band (e.g., LTE band B40) and the victim receiver 720 operates at WiFi. The various examples where the receive LO 460 may be set to a transmit frequency of the offending transmitter 702 are applicable to the various exemplary interference systems 400, 500, 600, 700 disclosed herein.

In other aspects of the interference cancellation systems 600, 700 disclosed herein, the victim receiver 720 may utilize the transmit pilot configuration opportunistically. That is, if the desired receive signal strength is low, then a non-pilot-based interference cancellation algorithm may be used. And, if the desired receive signal strength is high, then a pilot-based interference cancellation algorithm may be used.

Figure 8A:
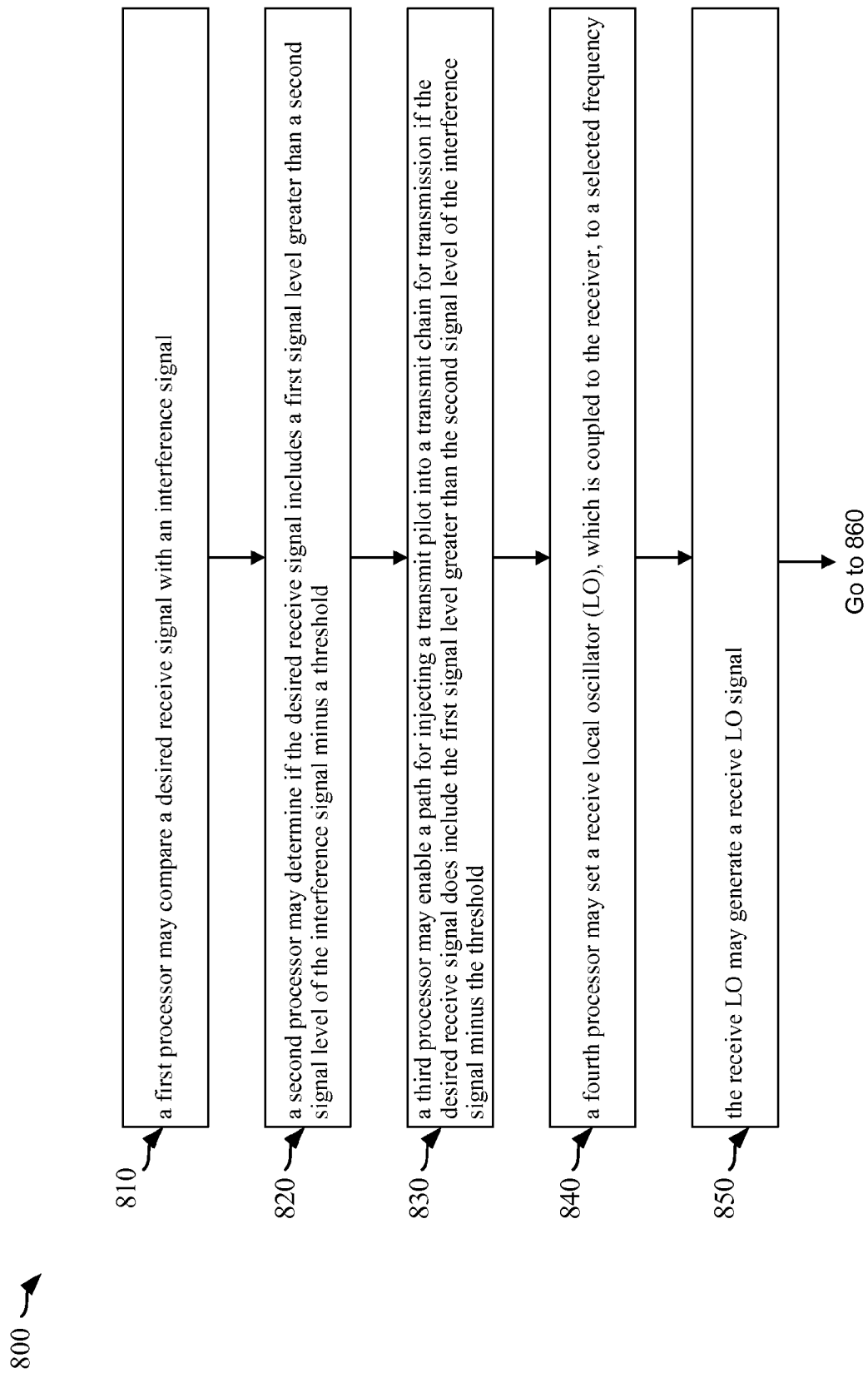
FIGS. 8a & 8b represent a flow diagram 800 illustrating an example of interference cancellation in accordance with certain aspects disclosed herein.
Figure 8B:
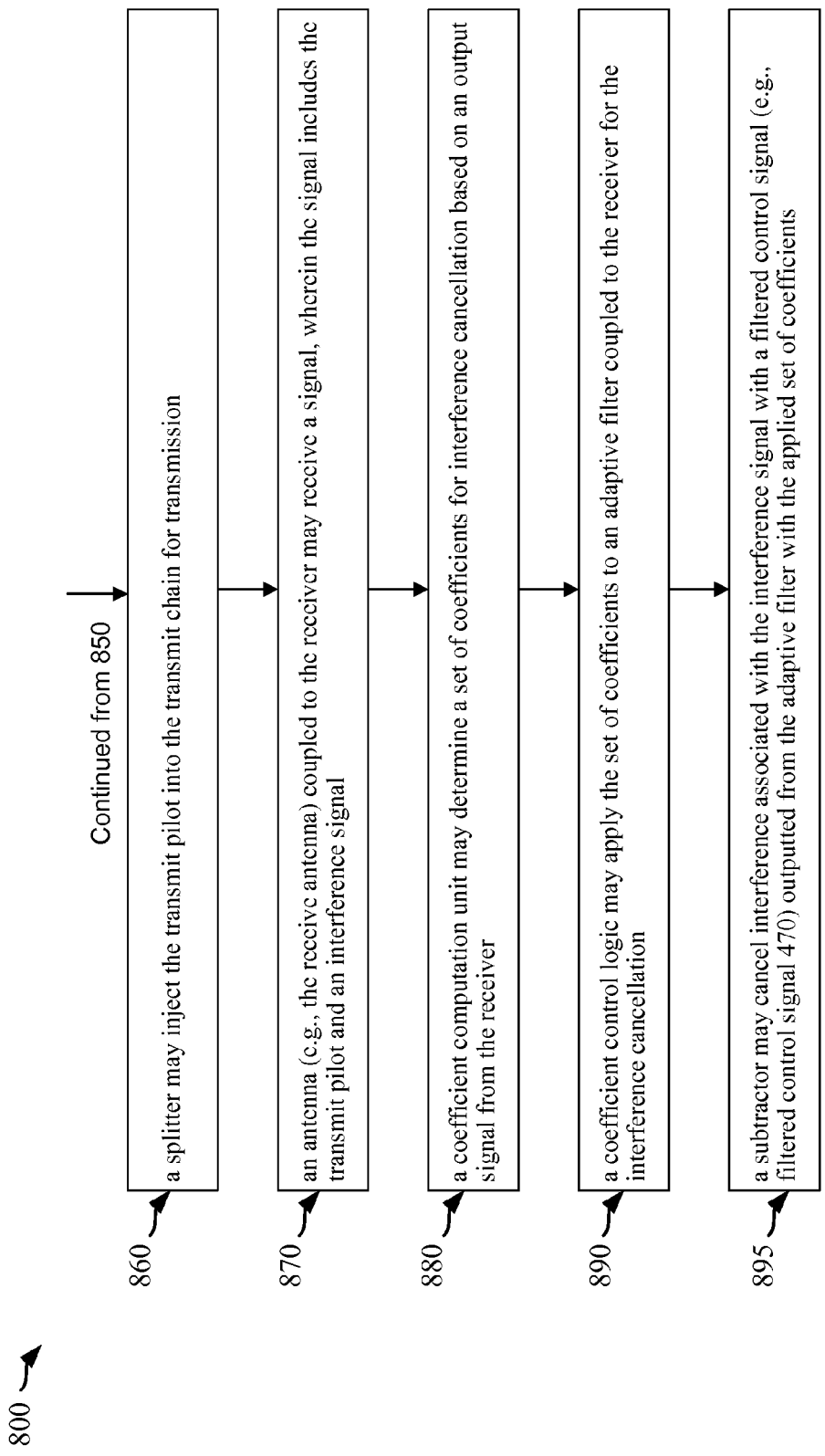

FIGS. 8a & 8b represent a flow diagram 800 illustrating an example of interference cancellation in accordance with certain aspects disclosed herein. In block 810, a first processor may compare a desired receive signal with an interference signal. In various examples, an initial set of coefficients (a.k.a. a first set of coefficients) is used for initialization, wherein the initialization is of an adaptive filter (e.g., adaptive filter 416). In various examples, the interference signal is initially filtered by the adaptive filter using the initial set of coefficients.

In block 820, a second processor may determine if the desired receive signal includes a first signal level greater than a second signal level of the interference signal minus a threshold. In various examples, the threshold may be between 8 dB and 12 dB. In one particular example, the threshold is 10 dB. If no (i.e., the desired receive signal does not include a first signal level greater than a second signal level of the interference signal minus a threshold), return to block 810 after a predetermined time period. One skilled in the art would understand that the predetermined time period may be set based on one or more of the following factors, application consideration, user choice, etc. If yes (i.e., the desired receive signal does include a first signal level greater than a second signal level of the interference signal minus a threshold), proceed to block 830.

In block 830, a third processor may enable a path for injecting a transmit pilot into a transmit chain for transmission if the desired receive signal does include the first signal level greater than the second signal level of the interference signal minus the threshold. In various examples, the third processor may cause a switch to enable the path for injecting the transmit pilot. For example, closing the switch 610 in the path 465 (see FIGS. 6 & 7) enables the path 465.

In block 840, a fourth processor may set a receive local oscillator (LO), which is coupled to the receiver, to a selected frequency. For example, the selected frequency may be a receive frequency of a victim receiver or a transmit frequency of an offending transmitter. In various examples, the offending transmitter is the source of an interference signal and the victim receiver is the recipient of the interference signal. In various examples, the first, second, third and fourth processors disclosed respectively in blocks 810 through 840 may be the same processor or may be multiple processors. As an example, the flow diagram 800 shows the processors as the same one.

In block 850, the receive LO may generate a receive LO signal. The receive LO signal may be used as a reference signal in a receive chain for downconversion. And, the receive LO signal may also be used as the transmit pilot injected into the transmit chain. In various examples, a splitter 464 (see FIG. 5) provides two paths for the receive LO signal, a first path to the receive chain for downconversion and a second path to the transmit chain for implementing as a transmit pilot. In the flow diagram of FIGS. 8a & 8b, the victim receiver may be referred to as a receiver. The offending transmitter and the receiver may be part of a same device or may each be part of different devices. In various examples, the offending transmitter and the receiver each operate with different radio access technologies (RATs). For example, the offending transmitter may operate at a Long Term Evolution (LTE) band and the receiver may operate at a WiFi band. In various examples, the receiver and the offending transmitter associated with the transmit chain share a same antenna. In other examples, the receiver is coupled to a receive antenna and the offending transmitter is coupled to a transmit antenna, different from the receive antenna.

In block 860, a splitter may inject the transmit pilot into the transmit chain for transmission. That is, the splitter (e.g., splitter 464) may inject the transmit pilot into a path (e.g., transmission line 465) to the transmit chain for transmission via a coupler (e.g., coupler 409). In various examples, the transmit pilot is the receive LO signal generated by the receive local oscillator (LO). The transmit pilot is used in the transmit chain to create a strong correlation in the receiver. The transmit chain is the signal path within the offending transmitter.

In block 870, an antenna (e.g., the receive antenna) coupled to the receiver may receive a signal, wherein the signal includes the transmit pilot and an interference signal. The signal received in block 870 is not equal to the desired receive signal. For example, the signal received by the receiver includes the desired receive signal, the interference signal and the transmit pilot. The desired receive signal is a signal that the receiver would like to receive (i.e., desires to receive) and does not include the interference signal.

In block 880, a coefficient computation unit may determine a set of coefficients for interference cancellation based on an output signal from the receiver. The output signal is, for example, measured at the output of the receiver, which may correspond to the in-phase filtered baseband signal 496a and/or the quadrature filtered baseband signal 496b illustrated in FIGS. 5-7. In various examples, the coefficient computation unit resides within a coefficient controller. The coefficient controller may be a processing circuit with one or more processors for performing a specific function. In various examples, the coefficient computation unit is one of the processors within the processing circuit.

In block 890, a coefficient control logic may apply the set of coefficients to an adaptive filter (e.g., adaptive filter 416) coupled to the receiver for the interference cancellation. In various examples, the coefficient control logic resides within the coefficient controller. And, if the coefficient controller is a processing circuit with one or more processors for performing a specific function, the coefficient control logic may be one of the processors within the processing circuit. The coefficient control logic may or may not share the same processor as the coefficient computation unit. In various examples, the coefficient computation unit (and hence, the coefficient controller) utilizes a least mean square (LMS) error criterion for determining the set of coefficients to be applied by the coefficient control logic to the adaptive filter. In various examples, the adaptive filter is a single tap least mean square (LMS) filter. In various examples, the adaptive filter is a single tap minimum mean square error (MMSE) filter. That is, aspects of the present disclosure may be applied to an AIC circuit utilizing an MMSE filter. In such an example, where the present disclosure refers to the determination of LMS coefficients, those skilled in the art will comprehend that such examples may be modified to the determination of MMSE coefficients. Further, where the present disclosure refers to a coefficient computation unit utilizing an LMS error criterion, those skilled in the art will comprehend that such examples may be modified to the utilization of an MMSE error criterion.

In block 895, a subtractor may cancel interference associated with the interference signal with a filtered control signal (e.g., filtered control signal 470) outputted from the adaptive filter with the applied set of coefficients.

In various examples, the method of flow diagram 800 (of FIGS. 8a & 8b) may be implemented by one or more of the exemplary interference cancellation systems illustrated in FIGS. 5, 6 and/or 7. In other examples, the method of flow diagram 800 (of FIGS. 8a & 8b) may be implemented by the exemplary wireless communication device illustrated in FIG. 3. In yet other examples, the method of flow diagram 800 (of FIGS. 8a & 8b) may be implemented by the processing circuit illustrated in FIG. 9 and/or FIG. 10 (infra). In various examples, the method of flow diagram 800 (of FIGS. 8a & 8b) may be implemented by any other suitable apparatus or means for carrying out the described functions.

Figure 9:
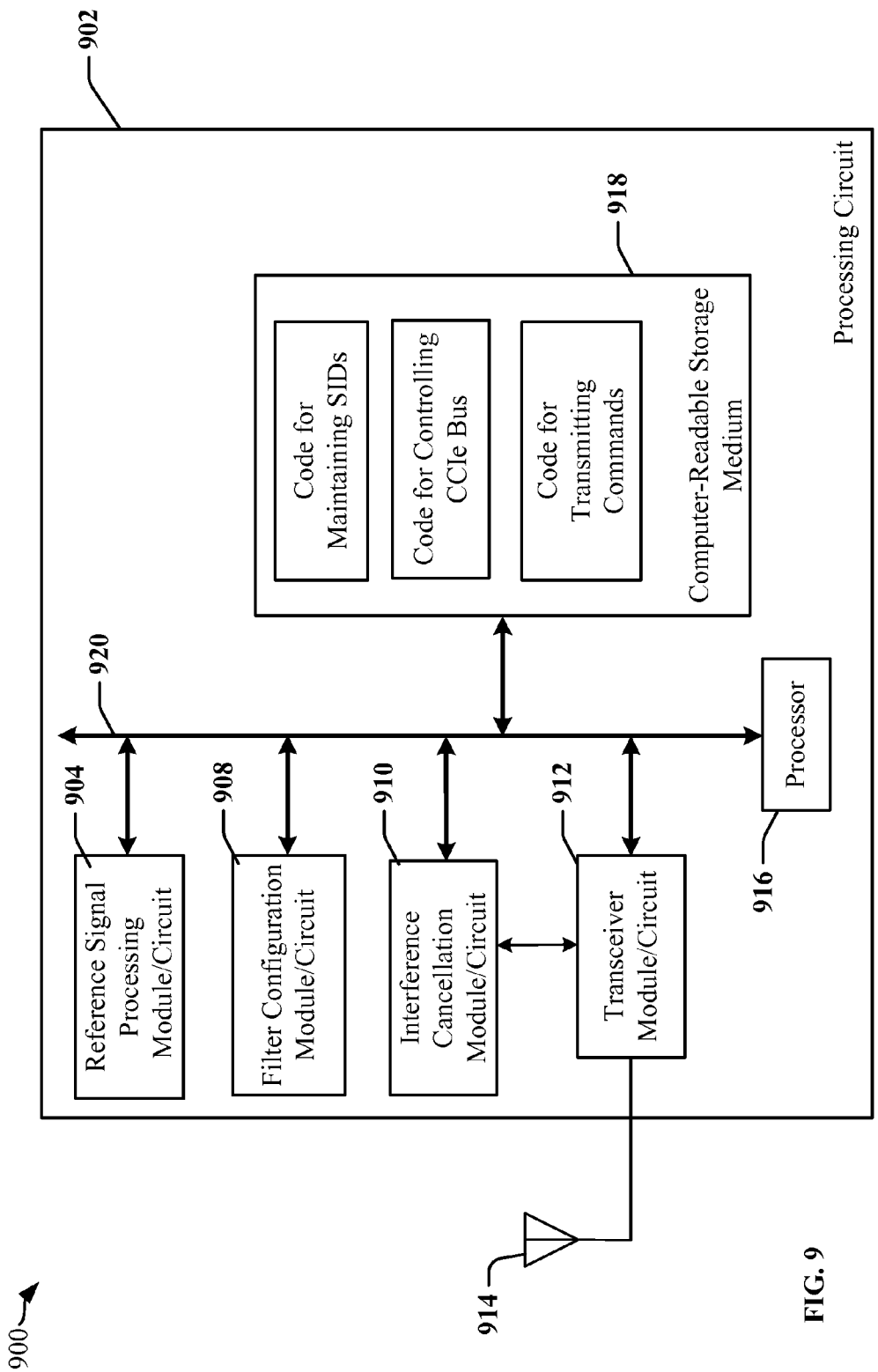
FIG. 9 is a diagram illustrating an example of a hardware implementation for an apparatus employing a processing employing a processing circuit adapted according to certain aspects disclosed herein.

FIG. 9 is a diagram illustrating a simplified example of a hardware implementation for an apparatus 900 employing a processing circuit 902. The processing circuit typically has a processor 916 that may include one or more of a microprocessor, microcontroller, digital signal processor, a sequencer and a state machine. The processing circuit 902 may be implemented with a bus architecture, represented generally by the bus 920. The bus 920 may include any number of interconnecting buses and bridges depending on the specific application of the processing circuit 902 and the overall design constraints. The bus 920 links together various circuits including one or more processors and/or hardware modules, represented by the processor 916, the modules or circuits 904 and 908, transceiver circuits 912 configurable to communicate over the one or more antennas 914 and the computer-readable storage medium 918. The bus 920 may also link various other circuits such as timing sources, peripherals, voltage regulators, and power management circuits, which are well known in the art, and therefore, will not be described any further.

The processor 916 is responsible for general processing, including the execution of software stored on the computer-readable storage medium 916. The software, when executed by the processor 916, causes the processing circuit 902 to perform the various functions described supra for any particular apparatus. The computer-readable storage medium 918 may also be used for storing data that is manipulated by the processor 916 when executing software, including data transmitted or received in RF signals transmitted over the one or more antennas 914, which may be configured as data lanes and clock lanes. The processing circuit 902 further includes at least one of the modules/circuits 904 and 908. The modules/circuits 904 and 908 may be software modules running in the processor 916, resident/stored in the computer-readable storage medium 918, one or more hardware modules coupled to the processor 916, or some combination thereof. The modules/circuits 904, 908 may include microcontroller instructions, state machine configuration parameters, or some combination thereof.

In one configuration, the apparatus 900 for wireless communication includes a module/circuit 904 that is configured to receive and process a reference signal representative of an interfering signal transmitted by apparatus 900, a module and/or circuit 908 configured to configure a filter using RF, baseband or digital feedback, and a module and/or circuit 99 configured to cancel interference in the RF signal. Although it is shown in FIG. 9 that the modules/circuits (e.g., 904, 908, 910, 912, 918) are external to processor 916, one would understand that one or more of these modules/circuits may reside within the processor 916.

Figure 10:
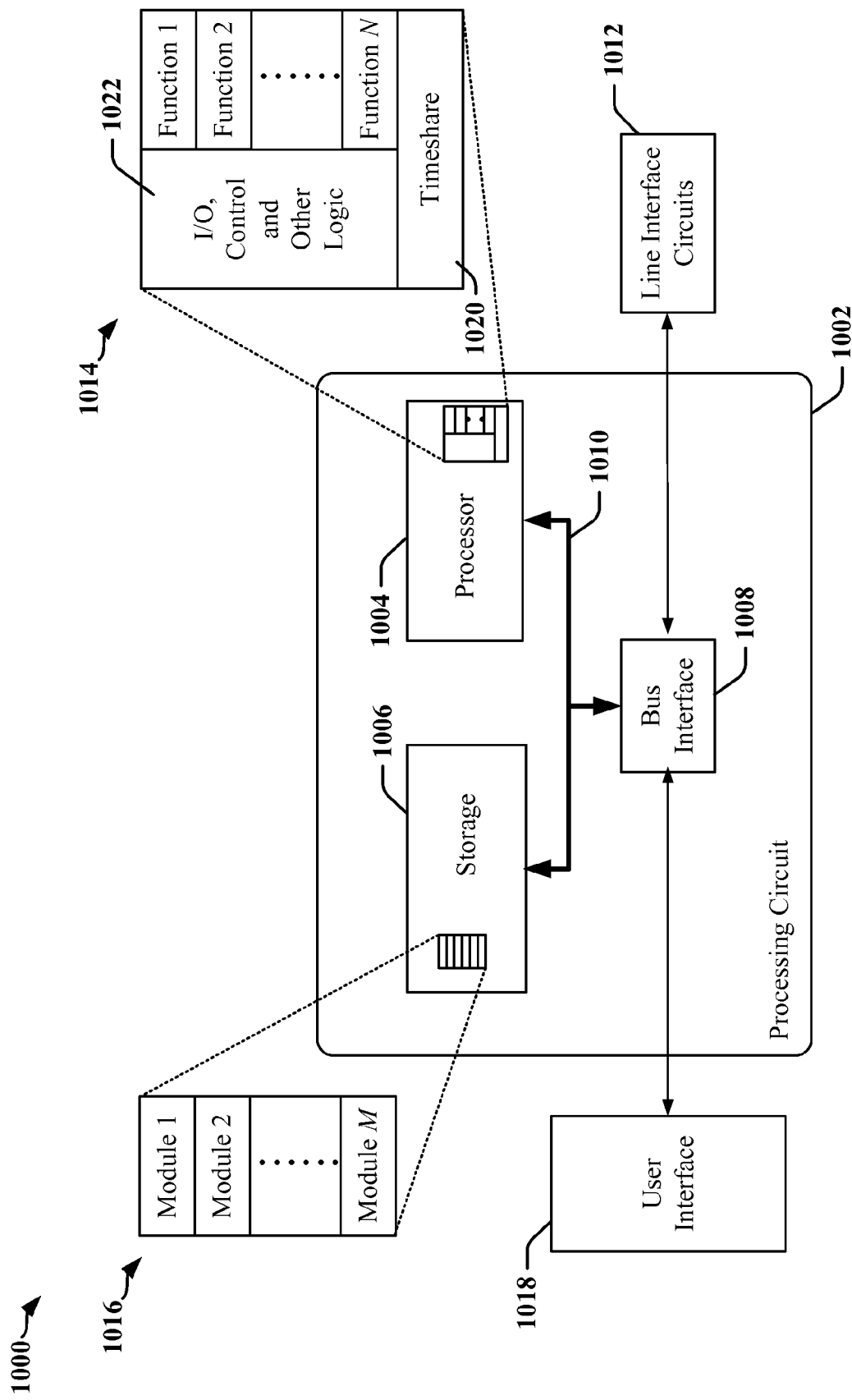
FIG. 10 is a block diagram illustrating an example of an apparatus employing a processing circuit that may be adapted according to certain aspects disclosed herein.

FIG. 10 is a conceptual diagram 1000 illustrating a simplified example of a hardware implementation for an apparatus employing a processing circuit 1002 that may be configured to perform one or more functions disclosed herein. In accordance with various aspects of the disclosure, an element, or any portion of an element, or any combination of elements as disclosed herein may be implemented using the processing circuit 1002. The processing circuit 1002 may include one or more processors 1004 that are controlled by some combination of hardware and software modules. Examples of processors 1004 include microprocessors, microcontrollers, digital signal processors (DSPs), field programmable gate arrays (FPGAs), programmable logic devices (PLDs), state machines, sequencers, gated logic, discrete hardware circuits, and other suitable hardware configured to perform the various functionality described throughout this disclosure. The one or more processors 1004 may include specialized processors that perform specific functions, and that may be configured, augmented or controlled by one of the software modules 1016. The one or more processors 1004 may be configured through a combination of software modules 1016 loaded during initialization, and further configured by loading or unloading one or more software modules 1016 during operation.

In the illustrated example, the processing circuit 1002 may be implemented with a bus architecture, represented generally by the bus 1010. The bus 1010 may include any number of interconnecting buses and bridges depending on the specific application of the processing circuit 1002 and the overall design constraints. The bus 1010 links together various circuits including the one or more processors 1004, and storage 1006. Storage 1006 may include memory devices and mass storage devices, and may be referred to herein as computer-readable storage media and/or processor-readable storage media. The bus 1010 may also link various other circuits such as timing sources, timers, peripherals, voltage regulators, and power management circuits. A bus interface 1008 may provide an interface between the bus 1010 and one or more transceivers 1012. A transceiver 1012 may be provided for each networking technology supported by the processing circuit. In some instances, multiple networking technologies may share some or all of the circuitry or processing modules found in a transceiver 1012. Each transceiver 1012 provides a means for communicating with various other apparatus over a transmission medium. Depending upon the nature of the apparatus, a user interface 1018 (e.g., keypad, display, speaker, microphone, joystick) may also be provided, and may be communicatively coupled to the bus 1010 directly or through the bus interface 1008.

A processor 1004 may be responsible for managing the bus 1010 and for general processing that may include the execution of software stored in a computer-readable storage medium that may include the storage 1006. In this respect, the processing circuit 1002, including the processor 1004, may be used to implement any of the methods, functions and techniques disclosed herein. The storage 1006 may be used for storing data that is manipulated by the processor 1004 when executing software, and the software may be configured to implement any one of the methods disclosed herein.

One or more processors 1004 in the processing circuit 1002 may execute software. Software shall be construed broadly to mean instructions, instruction sets, code, code segments, program code, programs, subprograms, software modules, applications, software applications, software packages, routines, subroutines, objects, executables, threads of execution, procedures, functions, algorithms, etc., whether referred to as software, firmware, middleware, microcode, hardware description language, or otherwise. The software may reside in computer-readable form in the storage 1006 or in an external computer-readable storage medium. The external computer-readable storage medium and/or storage 1006 may include a non-transitory computer-readable storage medium. A non-transitory computer-readable storage medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a "flash drive," a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable storage medium and/or storage 1006 may also include, by way of example, a carrier wave, a transmission line, and any other suitable medium for transmitting software and/or instructions that may be accessed and read by a computer. Computer-readable storage medium and/or the storage 1006 may reside in the processing circuit 1002, in the processor 1004, external to the processing circuit 1002, or be distributed across multiple entities including the processing circuit 1002. The computer-readable storage medium and/or storage 1006 may be embodied in a computer program product. By way of example, a computer program product may include a computer-readable storage medium in packaging materials. Those skilled in the art will recognize how best to implement the described functionality presented throughout this disclosure depending on the particular application and the overall design constraints imposed on the overall system.

The storage 1006 may maintain software maintained and/or organized in loadable code segments, modules, applications, programs, etc., which may be referred to herein as software modules 1016. Each of the software modules 1016 may include instructions and data that, when installed or loaded on the processing circuit 1002 and executed by the one or more processors 1004, contribute to a run-time image 1014 that controls the operation of the one or more processors 1004. When executed, certain instructions may cause the processing circuit 1002 to perform functions in accordance with certain methods, algorithms and processes described herein.

Some of the software modules 1016 may be loaded during initialization of the processing circuit 1002, and these software modules 1016 may configure the processing circuit 1002 to enable performance of the various functions disclosed herein. For example, some software modules 1016 may configure internal devices and/or logic circuits 1022 of the processor 1004, and may manage access to external devices such as the transceiver 1012, the bus interface 1008, the user interface 1018, timers, mathematical coprocessors, and so on. The software modules 1016 may include a control program and/or an operating system that interacts with interrupt handlers and device drivers, and that controls access to various resources provided by the processing circuit 1002. The resources may include memory, processing time, access to the transceiver 1012, the user interface 1018, and so on.

One or more processors 1004 of the processing circuit 1002 may be multifunctional, whereby some of the software modules 1016 are loaded and configured to perform different functions or different instances of the same function. The one or more processors 1004 may additionally be adapted to manage background tasks initiated in response to inputs from the user interface 1018, the transceiver 1012, and device drivers, for example. To support the performance of multiple functions, the one or more processors 1004 may be configured to provide a multitasking environment, whereby each of a plurality of functions is implemented as a set of tasks serviced by the one or more processors 1004 as needed or desired. In one example, the multitasking environment may be implemented using a timesharing program 1020 that passes control of a processor 1004 between different tasks, whereby each task returns control of the one or more processors 1004 to the timesharing program 1020 upon completion of any outstanding operations and/or in response to an input such as an interrupt. When a task has control of the one or more processors 1004, the processing circuit is effectively specialized for the purposes addressed by the function associated with the controlling task. The timesharing program 1020 may include an operating system, a main loop that transfers control on a round-robin basis, a function that allocates control of the one or more processors 1004 in accordance with a prioritization of the functions, and/or an interrupt driven main loop that responds to external events by providing control of the one or more processors 1004 to a handling function.

Several aspects of a telecommunications system have been presented. As those skilled in the art will readily appreciate, various aspects described throughout this disclosure may be extended to various types of telecommunication systems, network architectures and communication standards.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first die may be coupled to a second die in a package even though the first die is not directly physically in contact with the second die. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, blocks, features and/or functions illustrated in the figures may be rearranged and/or combined into a single component, block, feature or function or embodied in several components, blocks, or functions. Additional elements, components, blocks, and/or functions may also be added without departing from novel features disclosed herein. The apparatus, devices, and/or components illustrated in the various drawings may be configured to perform one or more of the methods, features, or blocks described herein. The novel algorithms described herein may also be efficiently implemented in software and/or embedded in hardware.

It is to be understood that the specific order or hierarchy of blocks in the methods disclosed is an illustration of exemplary processes. Based upon design preferences, it is understood that the specific order or hierarchy of blocks in the methods may be rearranged. The accompanying method claims present elements of the various blocks in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method for interference cancellation, comprising:
upconverting a waveform to a transmit frequency by mixing the waveform with a transmit local oscillator (LO) signal generated by a transmit LO, to generate an offending signal;
transmitting the offending signal from the transmitter;
receiving the offending signal at a receiver;
downconverting the offending signal by mixing the offending signal with a receive local oscillator (LO) signal generated by a receive LO;
injecting the receive LO signal into a transmit chain of the transmitter to create a transmit pilot within the offending signal, the transmit pilot being distinct from the transmit LO signal; and
determining a set of coefficients for the interference cancellation based on an output signal from the receiver.

2. The method of claim 1, further comprising:
applying the set of coefficients to an adaptive filter coupled to the receiver; and
cancelling interference associated with the offending signal utilizing the adaptive filter with the applied set of coefficients.

3. The method of claim 2, wherein the adaptive filter is a single tap minimum mean square error (MMSE) filter.

4. The method of claim 1, further comprising utilizing a least mean square (LMS) error criterion for the determining the set of coefficients for the interference cancellation.

5. The method of claim 1, further comprising:
enabling a path for the injecting the receive LO signal into the transmit chain if a first signal level of a desired receive signal is greater than a second signal level of the offending signal minus a threshold.

6. The method of claim 5, wherein the threshold is between 8 dB and 12 dB.

7. The method of claim 5, further comprising enabling the path for injecting the transmit pilot utilizing a switch.

8. The method of claim 1, further comprising setting the receive LO to the transmit frequency of the offending signal, such that the transmit pilot enables interference cancellation of the offending signal at a fundamental frequency of the offending signal.

9. The method of claim 1, wherein the transmitter operates at a Long Term Evolution (LTE) band and the receiver operates at a WiFi band.

10. The method of claim 1, wherein the receiver and the transmitter share a same antenna.

11. The apparatus of claim 1, wherein the transmitter operates at a Long Term Evolution (LTE) band and the receiver operates at a WiFi band.

12. An apparatus for interference cancellation, comprising:
a transmitter comprising a transmit local oscillator (LO) for generating a transmit LO signal and a transmit mixer for mixing a waveform with the transmit LO signal to generate an offending signal, the transmitter configured to transmit an offending signal;
a receiver comprising a receive LO for generating a receive LO signal and a receive mixer for mixing a received signal with the receive LO signal;
a splitter coupled to the receive LO for injecting the receive LO signal into a transmit chain of the transmitter to create a transmit pilot within the offending signal, the transmit pilot being distinct from the transmit LO signal; and
a processor coupled to the receiver for determining a set of coefficients for the interference cancellation based on an output signal from the receiver.

13. The apparatus of claim 12, further comprising:
a coefficient control logic for applying the set of coefficients to an adaptive filter coupled to the receiver; and
a subtractor for cancelling interference associated with the offending signal with a filtered control signal outputted from the adaptive filter with the applied set of coefficients.

14. The apparatus of claim 13, wherein the adaptive filter is a single tap minimum mean square error (MMSE) filter.

15. The apparatus of claim 12, wherein the processor, being configured for determining the set of coefficients, is further configured to utilize a least mean square (LMS) error criterion for determining the set of coefficients for the interference cancellation.

16. The apparatus of claim 12, further comprising:
a switch coupled to the processor for enabling a path between the splitter and the transmit chain for injecting the transmit pilot into the transmit chain if a first signal level of a desired receive signal is greater than a second signal level of the offending signal minus a threshold.

17. The apparatus of claim 16, wherein the threshold is between 8 dB to 12 dB.

18. The apparatus of claim 12, further comprising a second processor for setting the receive LO to the transmit frequency of the offending signal, such that the transmit pilot enables interference cancellation of the offending signal at a fundamental frequency of the offending signal.

19. The apparatus of claim 12, further comprising an antenna;
wherein the receiver and the transmitter share the antenna.

20. An apparatus for interference cancellation, comprising:
means for upconverting a waveform to a transmit frequency by mixing the waveform with a transmit local oscillator (LO) signal generated by a means for generating the transmit LO signal, to generate an offending signal;
means for transmitting the offending signal;
means for receiving the offending signal;
means for downconverting the offending signal by mixing the offending signal with a receive local oscillator (LO) signal generated by a means for generating the receive LO signal;
means for injecting the receive LO signal into a transmit chain of the means for transmitting, to create a transmit pilot within the offending signal, the transmit pilot being distinct from the transmit LO signal; and
means for determining a set of coefficients for the interference cancellation based on an output signal from the means for receiving.

21. The apparatus of claim 20, further comprising:
means for applying the set of coefficients to a means for adaptive filtering, wherein the means for adaptive filtering is coupled to the means for receiving; and
means for cancelling interference associated with the interference signal utilizing the means for adaptive filtering with the applied second set of coefficients.

22. A non-transitory computer-readable storage medium storing computer executable code, operable on a wireless communication device, the computer executable code comprising:
instructions for causing the wireless communication device to upconvert a waveform to a transmit frequency by mixing the waveform with a transmit local oscillator (LO) signal generated by a transmit LO, to generate an offending signal;

instructions for causing the wireless communication device to transmit the offending signal from the transmitter;

instructions for causing the wireless communication device to receive the offending signal at a receiver;

instructions for causing the wireless communication device to downconvert the offending signal by mixing the offending signal with a receive local oscillator (LO) signal generated by a receive LO;

instructions for causing the wireless communication device to inject the receive LO signal into a transmit chain of the transmitter to create a transmit pilot within the offending signal, the transmit pilot being distinct from the transmit LO signal; and instructions for causing the wireless communication device to determine a set of coefficients for interference cancellation of the offending signal based on an output signal from the receiver.

23. The non-transitory computer-readable storage medium of claim 22, wherein the computer executable code further comprises:

instructions for causing the wireless communication device to apply the set of coefficients to an adaptive filter coupled to the receiver; and instructions for causing the wireless communication device to cancel interference associated with the offending signal utilizing the adaptive filter with the applied second set of coefficients.

* * * * *